C. W. PARKER.
TRANSMISSION GEARING.
APPLICATION FILED FEB. 24, 1910.
982,856.
Patented Jan. 31, 1911.
6 SHEETS—SHEET 1.
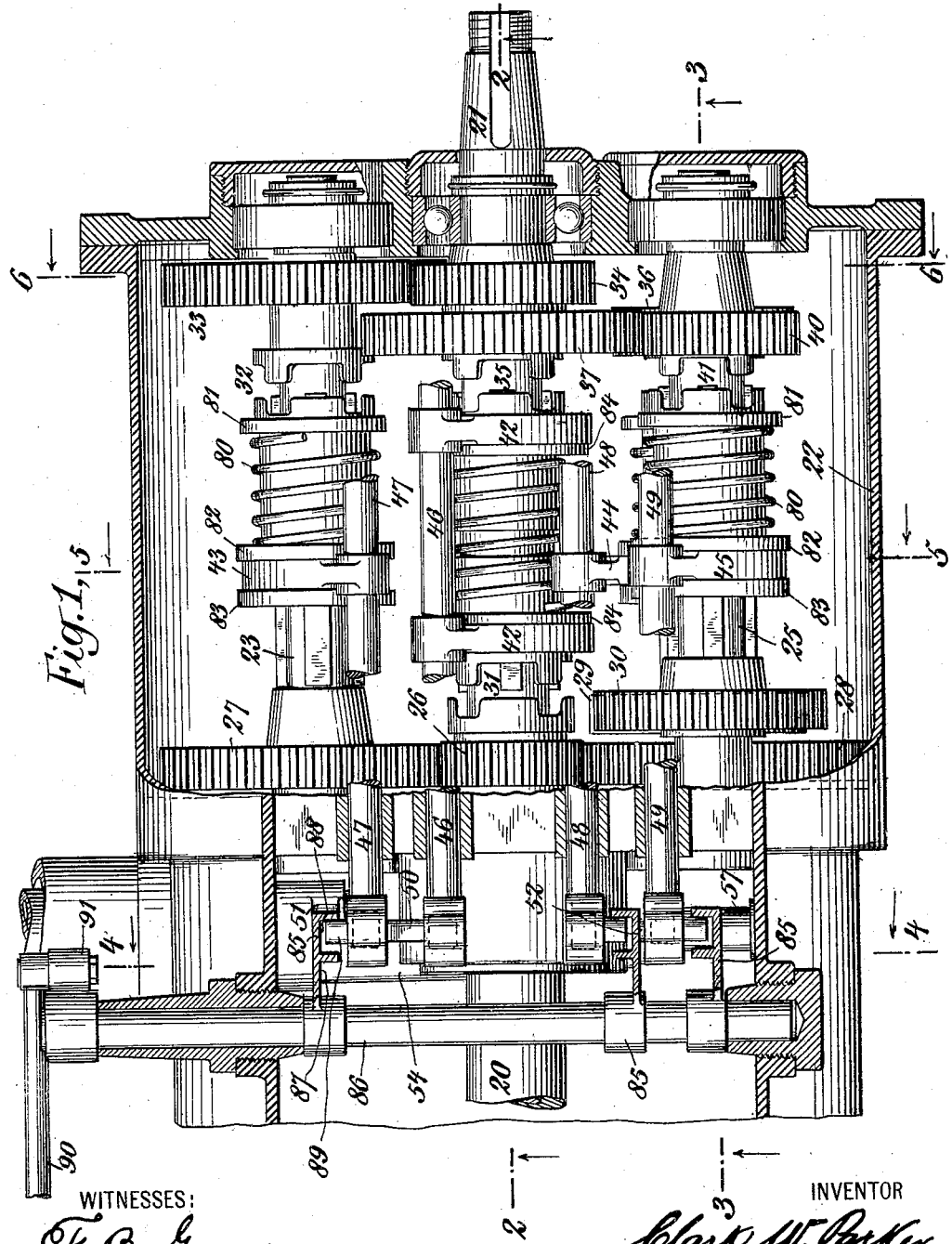
WITNESSES:
F. B. Graves
J. S. Andrews Jr.
INVENTOR
Clark W. Parker
BY
Chapin Wayland
his ATTORNEYS

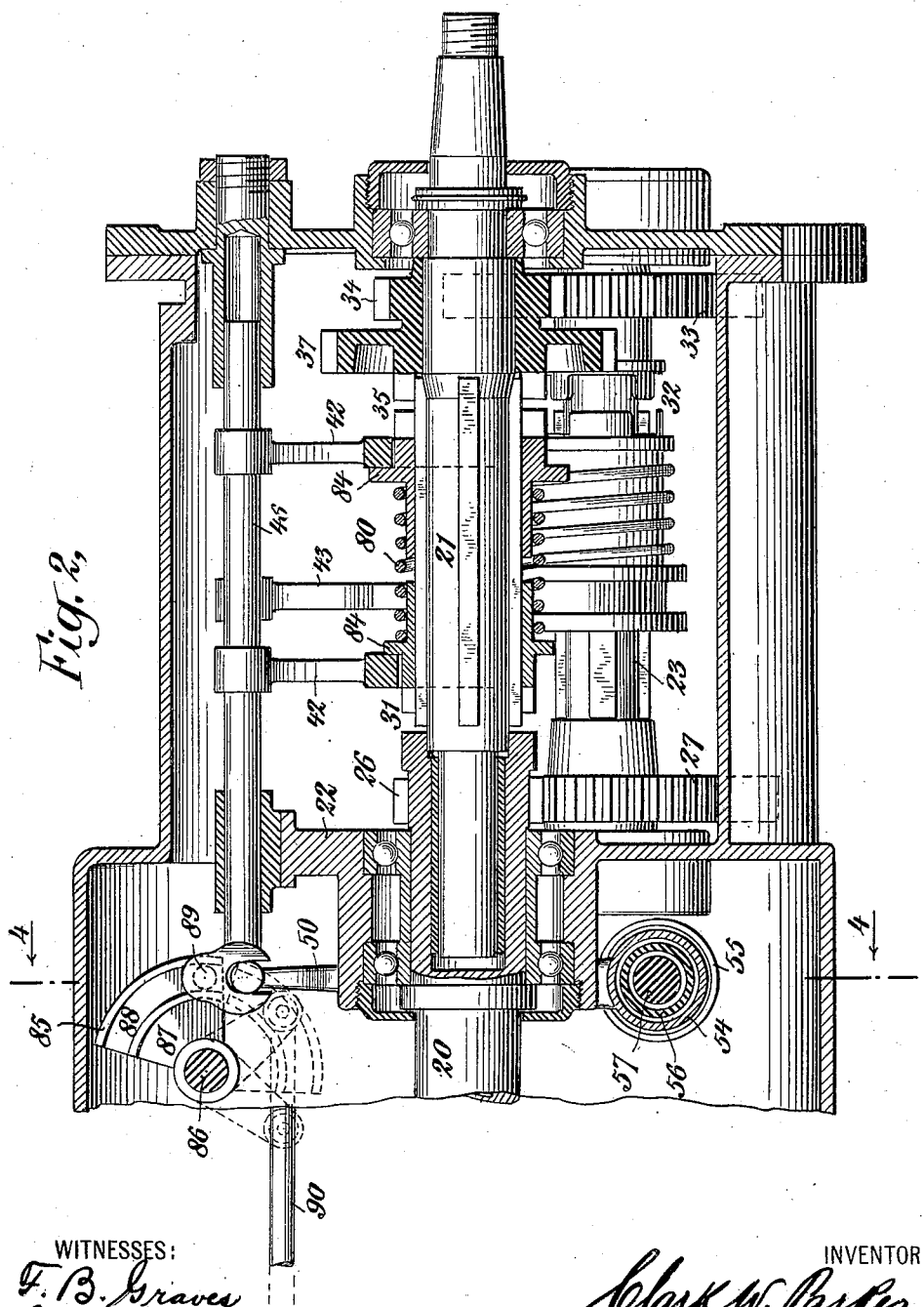

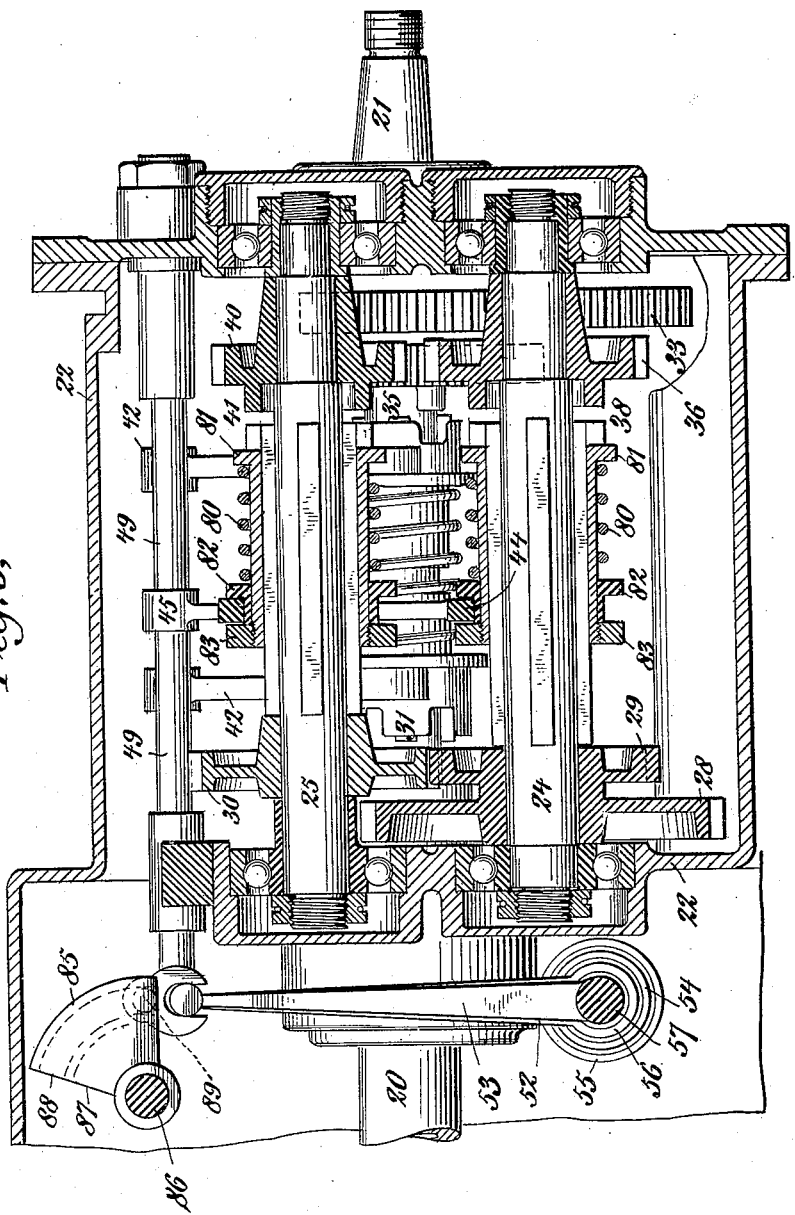

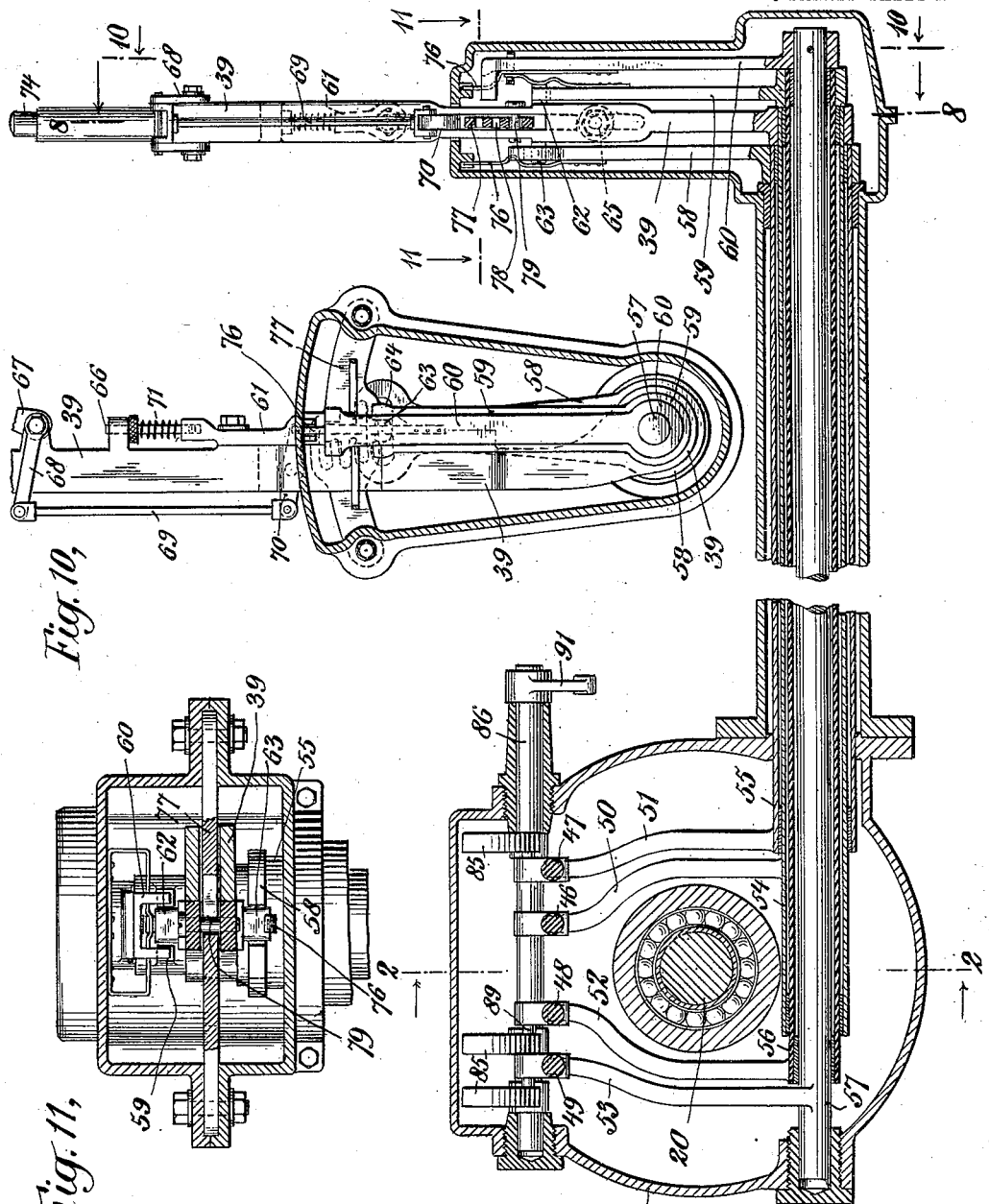

C. W. PARKER.
TRANSMISSION GEARING.
APPLICATION FILED FEB. 24, 1910.
982,856.
Patented Jan. 31, 1911.
6 SHEETS—SHEET 5.
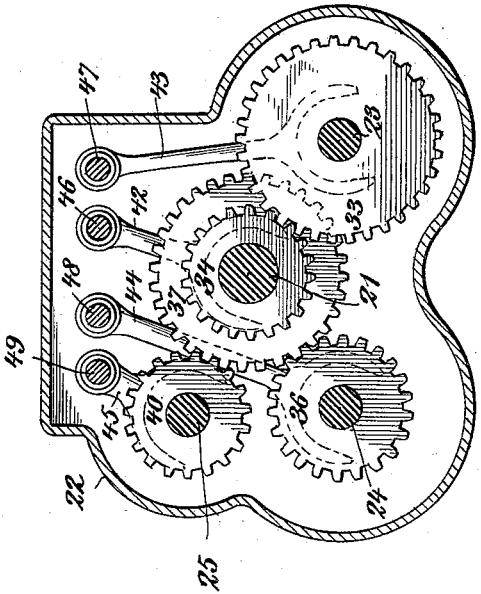
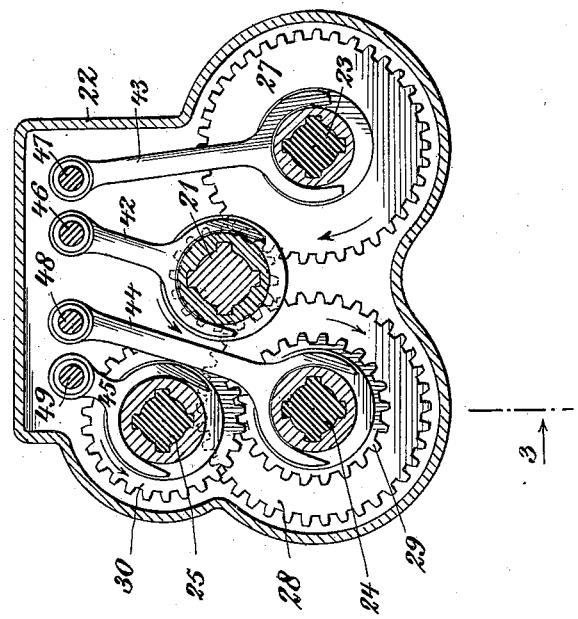

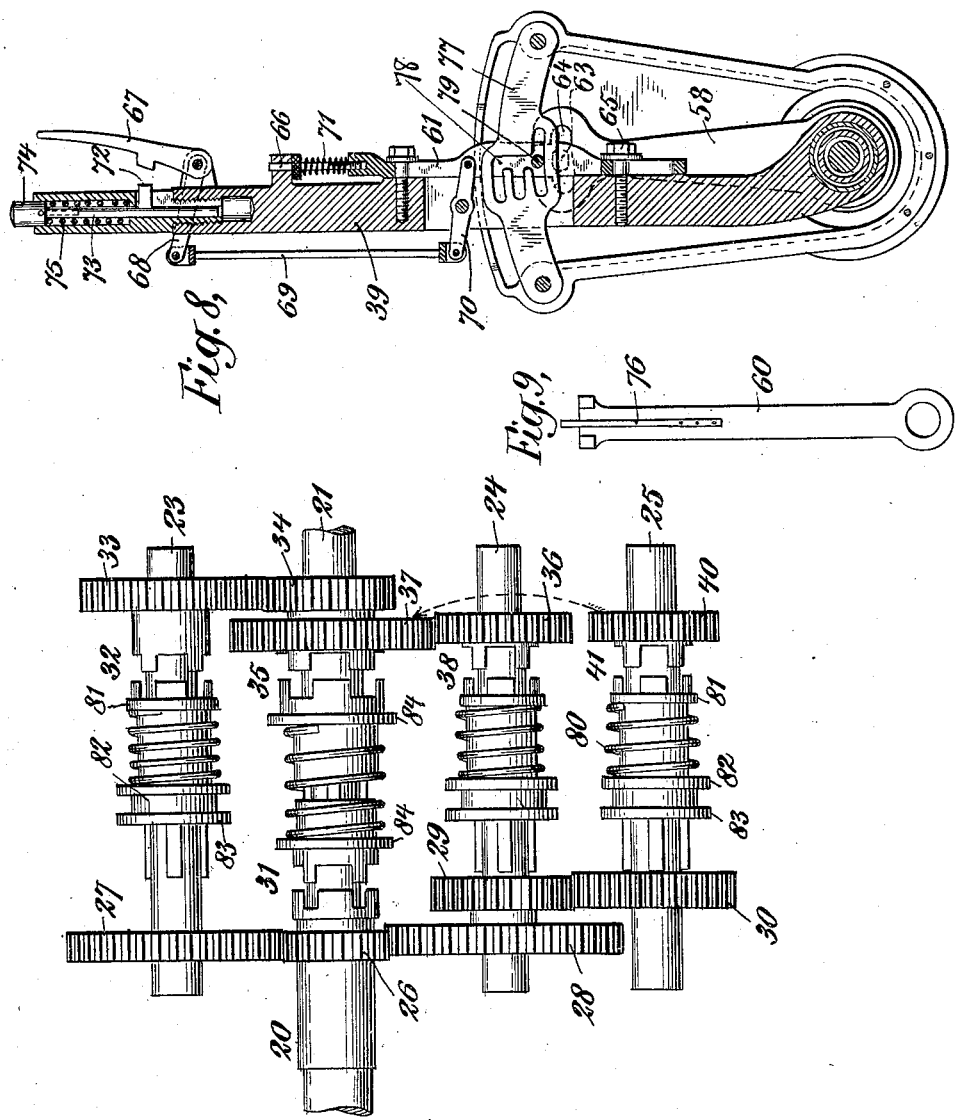

UNITED STATES PATENT OFFICE.

CLARK W. PARKER, OF SPRINGFIELD, MASSACHUSETTS, ASSIGNOR TO PARKER TRANSMISSION & APPLIANCE COMPANY, OF SPRINGFIELD, MASSACHUSETTS, A CORPORATION OF MASSACHUSETTS.

TRANSMISSION-GEARING.

982,856.      Specification of Letters Patent.      Patented Jan. 31, 1911.

Application filed February 24, 1910. Serial No. 545,563.

*To all whom it may concern:*

Be it known that I, CLARK W. PARKER, a citizen of the United States, and a resident of Springfield, county of Hampden, and State of Massachusetts, have invented certain new and useful Improvements in Transmission-Gearing, of which the following is a specification, reference being had to the accompanying drawings, forming a part thereof.

My invention relates to improvements in transmission gearing, and particularly to the class of transmission gearing employed in motor vehicle construction in which provision is made for changing the relative speed and direction of the driving movements imparted from the driving to the driven elements.

The main objects of my invention are to provide a substantial and practical form of transmission gearing of this character in which the changes of driving relation are brought about by the employment of positive jaw clutches as distinguished from sliding the gear wheels longitudinally into, and out of mesh with each other as is common in one type of transmission gearing, while retaining many of the advantageous features of the latter style of gearing as distinguished from the planetary style of transmission gearing.

To this end my invention consists in certain novel details of construction and combinations of parts such as will be fully pointed out hereinafter, and in order that my invention may be thoroughly understood, I will now proceed to describe an embodiment thereof, having reference to the accompanying drawings illustrating the same, and will then point out the noved features in claims.

In the drawings: Figure 1 is a top view of transmission gearing constructed in accordance with my invention, certain portions of the casing being broken away in order to show the parts within it, and the controlling means being omitted. Fig. 2 is a view in central longitudinal section therethrough upon the plane of the line 2—2 of Figs. 1 and 4. Fig. 3 is a view in longitudinal section therethrough upon the plane of the line 3—3 of Fig. 1. Fig. 4 is a view in transverse section therethrough upon the plane of the line 4—4 of Fig. 1, the controlling lever and its correlated parts being also shown in this figure. Fig. 5 is a transverse sectional view upon the plane of the line 5—5 of Fig. 1. Fig. 6 is a transverse sectional view upon the plane of the line 6—6 of Fig. 1. Fig. 7 is a diagrammatic view showing a development of the gearing in order to illustrate the relationship of the several gears with respect to each other. Fig. 8 is a view in vertical transverse section, through the controlling lever and certain of its correlated parts, the plane of section being indicated by the line 8—8 in Fig. 4. Fig. 9 is a detail view in side elevation of one of the operating arms which coacts with the controlling lever. Fig. 10 is a sectional view further illustrative of the controlling lever and its correlated parts, the plane of section being taken upon the line 10—10 of Fig. 4. Fig. 11 is a horizontal transverse sectional view of the same upon the plane of the line 11—11 of Fig. 4.

The driving shaft 20 and the driven shaft 21 are disposed, as is usual, in line with each other, the forward end of the driven shaft being received within a hollow portion of the driving shaft, preferably at a point where the driving shaft has a bearing in the casing 22, whereby the said driven shaft is suitably supported. Arranged parallel to the driving and driven shafts are three intermediate shafts which in the drawings have been designated respectively by the reference characters 23, 24, and 25. The shaft 23 I will hereinafter refer to as the intermediate shaft, the shaft 24 as the low speed shaft, and the shaft 25 as the reversing shaft. These three shafts are constantly driven by the driving shaft through gearing comprising a pinion 26 secured upon the driving shaft, a spur gear 27 in mesh therewith secured upon the intermediate shaft 23, another spur gear 28 secured upon the low speed shaft 24, a gear wheel 29 also secured upon the low speed shaft 24, and a gear wheel 30 in mesh therewith secured upon the reversing shaft 25.

Means are provided for connecting the driven shaft either directly with the driving shaft or indirectly therewith through the gearing in different driving relations as follows:—For direct high speed driving a jaw clutch 31 is provided, one member of which is secured fast upon the driving shaft, and the other member of which is secured upon the driven shaft 21 to rotate therewith, but is permitted a limited longitudinal movement with respect thereto. When this movable member is moved to engagement with the relatively stationary member the driving and driven shafts are secured fast together, as will be well understood, and direct high speed forward driving movements will result. For intermediate or second speed driving the movements of the driving shaft are transmitted through the intermediate shaft by means of a clutch 32, a spur gear 33, a pinion 34, and a clutch 35. The spur gear 33 is loosely mounted upon the intermediate shaft 23 and the pinion 34 is loosely mounted upon the driven shaft 21. The clutch 32 comprises a member secured fast to the spur gear 33 and another member secured upon the intermediate shaft 23 to rotate therewith, but permitted a limited longitudinal movement thereon whereby it may be moved into, and out of, engagement with the relatively stationary member. The clutch 35 similarly comprises a relatively stationary member secured fast to the pinion 34 and a relatively movable member mounted upon the driven shaft 21 to rotate therewith, but permitted a limited longitudinal sliding movement thereon. For intermediate forward driving movements the two clutches 32 and 35 are operated while the clutch 31 is adjusted to its out-of-operation position. The driving movements of the shaft 20 will then be transmitted from the pinion 26 to the spur gear 27 upon the intermediate shaft 23, thence through the clutch 32 and spur gear 33 to the pinion 34, and thence through the clutch 35 to the driven shaft 21. The pinion 34 is larger in proportion to the spur gear 33 than is the pinion 26 with relation to the spur gear 27; hence the speed of the movements imparted from the driving shaft 20 will be reduced and the driven shaft will be driven at a lower rate of speed. For third or low speed forward driving the low speed shaft 24 is employed. A pinion 36 is loosely mounted upon the said low speed shaft and is arranged in mesh with a spur gear 37 loosely mounted upon the driven shaft 21, but conveniently secured fast to the pinion 34 and relatively stationary member of the clutch 35. A clutch 38 is also employed having a relatively stationary member secured fast to the pinion 36, and a relatively movable member longitudinally movable upon the shaft 24 but secured to rotate therewith. For low speed forward driving the clutches 35 and 38 are operated while the clutches 31 and 32 are moved to their inoperative positions. In this condition of the parts the driving movements of the shaft 20 are imparted through the pinion 26 and spur gear 28 to the shaft 24, thence through the clutch 38 and pinion 36 to the spur gear 37, and thence through the clutch 35 to the driven shaft 21. There is, of course, a reduction of speed from the pinion 26 to the spur gear 28, and a further reduction from the pinion 36 to the spur gear 37; hence the speed will be largely reduced through the said gearing from the driving to the driven shaft. For reverse drive the reversing shaft 25 is employed, and for this purpose a loosely mounted pinion 40 is disposed upon the said shaft 25, the teeth thereof being disposed in mesh with the teeth of the gear wheel 37 (it being here noted that while in the diagrammatic view Fig. 7 the pinion 40 appears to be at some distance from the spur gear wheel 37, actually these two wheels are in intermeshing relation as will be well understood by reference to Fig. 6 of the drawings). A clutch 41 is also provided for connecting the pinion 40 with the reversing shaft 25, the said clutch including a relatively stationary member secured fast to the pinion 40, and a relatively movable member mounted to slide longitudinally upon the shaft 25 but connected to rotate therewith. When the two clutches 35 and 41 are operated while the clutches 31, 32 and 38 are left in an inoperative position, the driving movements of the driving shaft 20 will be transmitted through the pinion 26 to the spur gear 28 and shaft 24, thence through the gear wheel 29 to the gear wheel 30 and shaft 25, thence through the clutch 41 to the pinion 40, thence to the spur gear 37 and through the clutch 35 to the driven shaft 21. As the driving shaft goes in one direction, and the reversing shaft by its intermediate gear connection rotates in the same direction, it follows that the direct connection from the pinion 40 to the spur gear 37 will result in causing the driven shaft to be rotated at such times in the opposite direction, and the ratio given is arranged to be such as to cause such movements to be imparted at a low rate of speed.

The movable members of the various clutches are connected through forked arms 42, 43, 44, 45 with shipper rods 46, 47, 48 and 49, the said shipper rods being mounted to slide longitudinally in suitable bearings in the casing, and these longitudinal sliding movements will be imparted therefrom through the forked arms to the different movable clutch members respectively. At their outer ends each of the shipper rods is provided with a guide piece, each of which is engaged by one of a set of rocking arms 50, 51, 52, 53. The rocker arms 50, 51, 52 are secured fast upon concentric sleeves 54, 55, 56, while the lever 53 is secured fast upon a central rock shaft 57, all as will be well understood by reference to Fig. 4 of the drawings. At their outer ends the said shaft and sleeves are provided with operating arms and a controlling lever as follows:—The controlling lever 39 is secured fast to the sleeve 54, the said sleeve carrying the rocking arm 50 which engages with the shipper rod 46 of the clutches 31 and 35 upon the driving and driven shafts; the sleeve 55 is provided with an operating arm 58 which may be termed the intermediate operating arm because of the fact that the rocking arm 51 upon the sleeve 55 engages the shipper rod 47 of the clutch 32 upon the intermediate shaft 23; the sleeve 56 is provided with an operating arm 59 which may be termed the low speed operating arm because of the fact that the sleeve 56 carries the rocking arm 52 which engages the shipper rod 48 for the clutch 38 upon the low speed shaft; and similarly the shaft 57 is provided with an operating arm 60 which may be termed the reverse operating arm because of the fact that the rocking arm 53 carried by the said shaft 57 engages the shipper rod 49 for the clutch 41 upon the reversing shaft 25.

When the controlling lever 39 is thrown in one direction it will move the shipper rod 46 forward and so throw into operation the high speed clutch 31, while when the said lever is moved in the opposite direction it will disengage the clutch 31 and cause the clutch 35 to become operative; in an intermediate position, both of the said clutches will be held in an inoperative position. This lever 39 carries therewith a slide 61 provided upon its opposite sides with studs or projecting portions 62, 63. These studs or projecting portions are arranged, in various positions of the slide, for engagement with the bifurcated ends of the intermediate, low speed, and reverse operating arms 58, 59, 60. In the position in which the slide is shown in the drawings (see particularly Figs. 4, 8, and 10) the lug 62 is shown as in engagement with the low speed operating arm 59. The stud or projection 63 upon the other side of the slide is received within a recessed portion 64 of the intermediate lever 58, whereby it will fail to operatively engage the operating arm 58 in any movement of the lever 39. With the slide in the position shown and described, the operation of the lever 39 will also cause a corresponding movement of the low speed operating arm 59, whereby when the controlling lever is moved in the direction to operate the clutch 35 the low speed clutch 38 will also be operated. The slide 61 is mounted to move vertically upon the controlling lever 39, being suitably guided therein as by means of a stud and slot connection 65 at its lower end, and a sliding rod connection 66 at its upper end; and the said slide is provided with means for moving it in one direction comprising a pivoted latch 67, a short arm or lever 68 secured thereto, a link 69, and a rocker arm 70 pivoted upon the lever 39 and in engagement at one end with the said slide; a spring 71 tends to move the slide to its lowermost position and to throw the latch 67 outward.

When the latch is pressed inward to the limit of the distance permitted by a stop 72 (see Fig. 8), the slide 61 will be lifted to a position wherein the lug 62 will be clear of the low speed operating arm 59, and the lug 63 will be in a position to engage the intermediate operating lever 58. When the parts are in this position a movement of the controlling lever 39 in the direction to operate the clutch 35 will simultaneously cause the operation of the intermediate clutch 32, as will be well understood. To operate the reverse clutch 41 simultaneously with the main clutch 35 it will be necessary to raise the slide to a position wherein the studs or projections 62, 63 will be clear of the operating arms 58, 59, and the lug 62 will be caused to engage the reverse operating arm 60. To effect this movement I provide means whereby the stop 72 may be moved out of the way to permit a further movement of the latch 67. Referring to Fig. 8 it will be seen that I have disposed the stop 72 upon a longitudinally sliding bar 73 provided at its upper extremity with a thumb piece 74 which projects beyond the upper end of the controlling lever 39. A spring 75 operates to move the thumb piece rod and stop upward to its normal rest position, but when it is desired to adjust the parts for conditions of reverse driving, the thumb of the operator may be employed to depress the button 74, whereupon the latch 67 may be moved inward to a degree sufficient to lift the slide to its third position. In the latter position the stud or projection 62 will be in engagement with the upper extremity of the reverse operating arm 60, whereby a movement of the controlling lever to operate the clutch 35 will result in the simultaneous operation of the reversing clutch 41.

To summarize the foregoing, the movement of the controlling lever to the right (as viewed in Figs. 8 and 10) will adjust the parts for high speed forward driving relation; to move the lever in the opposite direction without touching the latch 67 will adjust the parts for low speed driving relation; to move the lever from an intermediate position to the left while at the same time pressing the latch 67 toward the controlling lever, will result in adjusting the parts for intermediate or second speed driving relation,—while to impart a similar movement to the parts while depressing the thumb piece 74 will result in adjusting the parts for reverse driving relation. I conveniently provide a stationary guide piece 77 having a guiding slot 78 therein for coengagement with a guiding stud 79 upon the slide 61. This will act to guide the parts properly and to limit the movements of the controlling lever, and will permit the operator to release his hold of the latch when in intermediate or reverse driving connection without thereby permitting any movement of the slide 61.

In order to hold the operating arms 58, 59, 60 in their normal central rest positions when not being positively operated by the controlling lever I have provided each of the said arms with a spring locking latch 76, the upper extremity of which normally engages a stationary portion but which is adapted to be thrown out of such engagement by the moving into position of the projection or stud of the slide 61, for the purpose of imparting movements of the said operating arms.

The connection between the forked arms 42, 43, 44, 45 and the several clutches is preferably a yielding one, whereby to permit the operator to move the controlling lever immediately to the limit required for the complete operation thereof, before the movable clutch elements have actually engaged the relatively stationary clutch elements. This is particularly beneficial in the intermediate, low speed and reverse driving relations because of the fact that two clutches are operating simultaneously and it is seldom that they would both be caused to complete their coengagement simultaneously. This yielding means may be conveniently in the form of a helical spring 80 disposed between the movable clutch member and the operating arm, a suitable stop being provided for limiting the movement of the movable clutch member under the influence of the said spring (see Fig. 3). In the case of the clutches 32, 38 and 41 this spring may be disposed between a flange 81 upon the clutch member and a collar 82 which bears against the operating arm, a collar 83 secured to the movable clutch member bearing against the operating arm upon the other side and acting as a limiting stop. In the case of the clutches 31 and 35 the helical spring 80 may be conveniently disposed between the two movable members of the said clutches, tending to press them outward in opposite directions, the said clutch members being provided with flanges 84 which bear against the two forked arm elements 42 in such case provided (see Fig. 2).

Because of the fact that the force of the yielding springs 80 will be sufficient to throw the controlling lever partly backward from its operated position if it be released before the clutch members have become completely coengaged, I have provided means for positively locking the lever and the parts directly operated thereby in the position to which they are adjusted at any time. This locking means acts upon the shipper rods to hold them against movement either in the normal rest positions or in their operated positions, except when they are positively released by act of the operator. This locking means may conveniently comprise a plurality of quadrants 85 mounted upon a rock shaft 86 and having segmental guiding grooves 87, 88. In the normal rest position of the parts the segmental grooves 88 of the several quadrants are adapted for engagement with studs 89 with which the several shipper rods are respectively provided, while in the operated position of the said shipper rods the segmental grooves 87 or the exterior surfaces of the quadrants are arranged for such engagement. In the drawings (see particularly Figs. 2 and 3) the quadrants are shown in their locking position in full lines; to release the hold thereof upon the shipper rods the rock shaft 86 must be given a movement of rotation sufficient to move the locking quadrants to the position shown in dotted lines in Fig. 2. This movement may be given by means of a foot pedal or other operating means suitably connected with the rock shaft through the medium of a connecting rod 90 and an operating arm 91. Prior to the operation of the controlling lever it will be necessary for the operator to depress the foot pedal or other operating means for the locking quadrants, in order to release the parts,—then the controlling lever may be operated in the manner desired and the locking quadrants promptly returned to their locking position; then the operator may release his control of the controlling lever, and the coengagement of the clutch members under the operation of the helical springs may become completed at any time thereafter. By this means the operator may throw his controlling lever quickly from one position to another and need not thereafter hold it in the position to which he has moved it for a longer time than is necessary merely to release the locking means. Thereafter the parts are locked in their adjusted positions and there is no danger of their accidentally moving from one position to another, for they cannot be so moved except after the operator has positively released them through the operation of the locking means.

From the foregoing it will be seen that I have produced a strong, simple, and efficient form of transmission gearing in which there are no sliding gears but all of the parts are connected and disconnected through the medium of powerful jaw clutches, that the mechanism is positive in its operation throughout, and that accidental movement of the parts to shift from one driving relation to another is absolutely impossible. It will further be noticed that I have reduced the length of the mechanism as a whole to a remarkable degree, such a construction and arrangement resulting in not only reducing the space occupied by the gearing as a whole, but also in providing short shafts, reducing the "spring" upon them, and the consequent tendency of the gears to spring out of mesh or at least to operate only partly in mesh and thus to rattle and wear.

What I claim is:

1. In transmission gearing, the combination with a driving and a driven shaft arranged longitudinally in line with each other, of an intermediate shaft, a low speed shaft, and a reversing shaft, all disposed in parallel relation therewith, intermeshing gear wheels of different ratios upon the said shafts, certain of the said gear wheels being mounted loosely upon their respective shafts, clutches upon all of the said shafts for connecting the loosely mounted gear wheels with their shafts respectively, a single operating element, and means for selectively connecting the said operating element with the said clutches.

2. In transmission gearing, the combination with a driving and a driven shaft arranged longitudinally in line with each other, of an intermediate shaft, a low speed shaft, and a reversing shaft, all disposed in parallel relation therewith, a set of intermeshing gear wheels upon the driving, intermediate, low speed, and reversing shafts, another set of intermeshing gear wheels upon the driven, intermediate, low speed, and reversing shafts, certain of the said gear wheels being mounted loosely upon their respective shafts, clutches upon all of the said shafts for connecting the loosely mounted gear wheels with their shafts respectively, a single operating element, and means for selectively connecting the said operating element with the said clutches.

3. In transmission gearing, the combination with a driving and a driven shaft arranged longitudinally in line with each other, of an intermediate shaft, a low speed shaft, and a reversing shaft, all disposed in parallel relation therewith, a set of intermeshing gear wheels upon the driving, intermediate, low speed, and reversing shafts, another set of intermeshing gear wheels upon the driven, intermediate, low speed, and reversing shafts, the gear wheels of one of the said sets being loosely mounted upon their respective shafts, clutches upon all of the said shafts for connecting the loosely mounted gear wheels with their shafts respectively, a single operating element, and means for selectively connecting the said operating element with the said clutches.

4. In transmission gearing, the combination with a driving and a driven shaft arranged longitudinally in line with each other, of an intermediate shaft, a low speed shaft, and a reversing shaft, all disposed in parallel relation therewith, intermeshing gear wheels of different ratios upon the said shafts, certain of the said gear wheels being mounted loosely upon their respective shafts, clutches upon all of the said shafts for connecting the loosely mounted gear wheels with their shafts respectively, a clutch for directly connecting the driving and driven shafts together, a single operating element, and means for selectively connecting the said operating element with the said clutches.

5. In transmission gearing, the combination with a driving and a driven shaft arranged longitudinally in line with each other, of an intermediate shaft, a low speed shaft, and a reversing shaft, all disposed in parallel relation therewith, a set of intermeshing gear wheels upon the driving, intermediate, low speed, and reversing shafts, another set of intermeshing gear wheels upon the driven, intermediate, low speed, and reversing shafts, certain of the said gear wheels being mounted loosely upon their respective shafts, clutches upon all of the said shafts for connecting the loosely mounted gear wheels with their shafts respectively, a clutch for directly connecting the driving and driven shafts together, a single operating element, and means for selectively connecting the said operating element with the said clutches.

6. In transmission gearing, the combination with a driving and a driven shaft arranged longitudinally in line with each other, of an intermediate shaft, a low speed shaft, and a reversing shaft, all disposed in parallel relation therewith, a set of intermeshing gear wheels upon the driving, intermediate, low speed, and reversing shafts, another set of intermeshing gear wheels upon the driven, intermediate, low speed, and reversing shafts, the gear wheels of one of the said sets being loosely mounted upon their respective shafts, clutches upon all of the said shafts for connecting the loosely mounted gear wheels with their shafts respectively, a clutch for directly connecting the driving and driven shafts together, a single operating element, and means for selectively connecting the said operating element with the said clutches.

7. In transmission gearing, the combination with a driving and a driven shaft arranged longitudinally in line with each other, of a low speed and a reversing shaft disposed in parallel relation therewith, gear wheels connecting the low speed, reversing, and driving shafts together, other gear wheels mounted loosely upon the driven, low speed, and reversing shafts, clutches upon the driven, low speed, and reversing shafts, for connecting the said gear wheels in driving relation therewith, a single operating element for operating the said clutches, and means for selectively connecting the said operating element with the said clutches.

8. In transmission gearing, the combination with a driving and a driven shaft arranged longitudinally in line with each other, of a low speed and a reversing shaft disposed in parallel relation therewith, gear wheels connecting the low speed, reversing, and driving shafts together, other gear wheels mounted loosely upon the driven, low speed, and reversing shafts, clutches upon the driven, low speed, and reversing shaft, for connecting the said gear wheels in driving relation therewith, a clutch for connecting the driving and driven shafts directly together, a single operating element for operating the said clutches, and means for selectively connecting the said operating element with the said clutches.

9. In transmission gearing, the combination with a driving and a driven shaft arranged longitudinally in line with each other, of an intermediate shaft, a low speed shaft, and a reversing shaft,—all disposed in parallel relation therewith,—gear wheels connecting the said intermediate, low speed, reversing, and driving shafts together, other gear wheels mounted loosely upon the driven, intermediate, low speed, and reversing shafts, clutches upon the driven, intermediate, low speed, and reversing shafts, for conecting the said gear wheels in driving relation therewith, and means for operating the said clutches selectively.

10. In transmission gearing, the combination with a driving and a driven shaft arranged longitudinally in line with each other, of an intermediate shaft, a low speed shaft, and a reversing shaft,—all disposed in parallel relation therewith,—gear wheels connecting the said intermediate, low speed, reversing, and driving shafts together, other gear wheels mounted loosely upon the driven, intermediate, low speed, and reversing shafts, clutches upon the driven, intermediate, low speed, and reversing shafts, for connecting the said gear wheels in driving relation therewith, a clutch for connecting the driving and driven shafts directly together, and means for operating the said clutches selectively.

11. In transmission gearing, the combination with a driving and a driven shaft arranged longitudinally in line with each other, of an intermediate shaft and a low speed shaft disposed in parallel relation therewith, gear wheels connecting the intermediate, low speed, and driving shafts together, other gear wheels mounted loosely upon the driven, intermediate, and low speed shafts, clutches upon the driven, intermediate, and low speed shafts for connecting the said gear wheels in driving relation therewith, and means for operating the clutch upon the driven shaft and simultaneously therewith any one of the clutches upon the other said shafts.

12. In transmission gearing, the combination with a driving and a driven shaft arranged longitudinally in line with each other, of a low speed and a reversing shaft disposed in parallel relation therewith, gear wheels connecting the low speed, reversing, and driving shafts together, other gear wheels mounted loosely upon the driven, low speed, and reversing shafts, clutches upon the driven, low speed, and reversing shafts, for connecting the said gear wheels in driving relation therewith, and means for operating the clutch upon the driven shaft and simultaneously therewith any one of the clutches upon the other said shafts.

13. In transmission gearing, the combination with a driving and a driven shaft arranged longitudinally in line with each other, of an intermediate shaft, a low speed shaft, and a reversing shaft,—all disposed in parallel relation therewith,—gear wheels connecting the said intermediate, low speed, reversing, and driving shafts together, other gear wheels mounted loosely upon the driven, intermediate, low speed, and reversing shafts, clutches upon the driven, intermediate, low speed, and reversing shafts, for connecting the said gear wheels in driving relation therewith, and means for operating the clutch upon the driven shaft and simultaneously therewith any one of the clutches upon the other said shafts.

14. In transmission gearing, the combination with a driving and a driven shaft arranged longitudinally in line with each other, of an intermediate shaft and a low speed shaft disposed in parallel relation therewith, gear wheels connecting the intermediate, low speed, and driving shafts together, other gear wheels mounted loosely upon the driven, intermediate, and low speed shafts, clutches upon the driven, intermediate, and low speed shafts for connecting the said gear wheels in driving relation therewith, a clutch for connecting the driving and driven shafts directly together, and means for operating the high speed clutch alone, or the clutch upon the driven shaft simultaneously with any one of the clutches upon the other said shafts.

15. In transmission gearing, the combination with a driving and a driven shaft arranged longitudinally in line with each other, of a low speed and a reversing shaft disposed in parallel relation therewith, gear wheels connecting the low speed, reversing, and driving shafts together, other gear wheels mounted loosely upon the driven, low speed, and reversing shafts, clutches upon the driven, low speed, and reversing shafts, for connecting the said gear wheels in driving relation therewith, a clutch for connecting the driving and driven shafts directly together, and means for operating the high speed clutch alone, or the clutch upon the driven shaft simultaneously with any one of the clutches upon the other said shafts.

16. In transmission gearing, the combination with a driving and a driven shaft arranged longitudinally in line with each other, of an intermediate shaft, a low speed shaft, and a reversing shaft,—all disposed in parallel relation therewith,—gear wheels connecting the low speed, reversing, and driving shafts together, other gear wheels mounted loosely upon the driven, intermediate, low speed, and reversing shafts, clutches upon the driven, intermediate, low speed, and reversing shafts, for connecting the said gear wheels in driving relation therewith, a clutch for connecting the driving and driven shafts directly together, and means for operating the high speed clutch alone, or the clutch upon the driven shaft simultaneously with any one of the clutches upon the other said shafts.

17. In transmission gearing, the combination with a driving and a driven shaft arranged longitudinally in line with each other, a plurality of shafts arranged parallel therewith, and intermeshing gear wheels of different ratios upon the several shafts, of clutches for connecting certain of the gear wheels in driving relation therewith, shipper rods for the said clutches, yielding means between the said shipper rods and the said clutches, an operating lever for the shipper rods, means for selectively connecting the said operating lever with the said shipper rods, positive locking means for the said shipper rods, and means independent of the said operating lever for operating the said locking means.

18. In transmission gearing, the combination with a driving and a driven shaft arranged longitudinally in line with each other, a plurality of shafts arranged parallel therewith, and intermeshing gear wheels of different ratios upon the several shafts, of clutches for connecting certain of the gear wheels in driving relation therewith, shipper rods for the said clutches, yielding means between the said shipper rods and the said clutches, means for moving the shipper rods longitudinally to operate the clutches, an operating lever for the shipper rods, means for selectively connecting the said operating lever with the said shipper rods, positive locking means for engaging the shipper rods at the limit of their movements in either direction to lock them in their operated or non-operated positions, and means independent of the said operating lever for operating the said locking means.

19. In transmission gearing, the combination with a driving and a driven shaft arranged longitudinally in line with each other, a plurality of shafts arranged parallel therewith, and intermeshing gear wheels of different ratios upon the several shafts, of clutches for connecting certain of the gear wheels in driving relation therewith, shipper rods for the said clutches, yielding means between the said shipper rods and the said clutches, a rock shaft, and locking quadrants upon the rock shaft arranged to engage parts carried by the said shipper rods, to lock them normally against movement.

20. Transmission gearing of the class described including driving and driven shafts in axial alinement, intermediate, low speed, and reversing shafts grouped around them and in permanent driving relation with the driving shaft, gear wheels freely mounted upon the driven, intermediate, low speed, and reversing shafts, a clutch upon each of the said shafts for connecting the various gear wheels in driving relation with the respective shafts, a high speed clutch between the driving and the driven shafts, a single operating element for operating the said clutches, and means for selectively connecting the said operating element with the said clutches.

21. Transmission gearing of the class described including driving and driven shafts in axial alinement, intermediate, low speed, and reversing shafts grouped around them in permanent driving relation with the driving shaft, gear wheels freely mounted upon the driven, intermediate, low speed, and reversing shafts, a clutch upon each of the said shafts for connecting the various gear wheels in driving relation with the respective shafts, a high speed clutch between the driving and the driven shafts, means connected with the clutch upon the driven shaft for operating the same, and means for coupling the clutches upon the intermediate, low speed, and reversing shafts respectively therewith, at will.

CLARK W. PARKER.

Witnesses:
F. B. GRAVES,
LYMAN S. ANDREWS, Jr.